Patented May 22, 1923.

1,456,492

UNITED STATES PATENT OFFICE.

DONALD MacKNIGHT HEPBURN, OF PHILADELPHIA, PENNSYLVANIA.

SURFACING COMPOSITION FOR HIGHWAYS AND THE LIKE.

No Drawing.     Application filed June 17, 1921. Serial No. 478,328.

*To all whom it may concern:*

Be it known that I, DONALD MACKNIGHT HEPBURN, a citizen of the United States, residing at the city of Philadelphia, county of Philadelphia, and State of Pennsylvania, have invented certain new and useful Improvements in Surfacing Composition for Highways and the like, of which the following is a specification.

This invention relates to surfacing and resurfacing of highways, roads, streets and the like and the leading object of the present invention may be said to be the providing of a method of preparing and laying a topping for road-beds and the like which provides a lasting construction and one which may be readily prepared and laid in situ. Other and further objects will hereinafter appear.

The invention consists of the improvements hereinafter described and finally claimed.

The nature, characteristic features and scope of the invention will be more full understood from the following description of my method.

In the practice of my method I usually employ a conventional mixing machine although obviously the materials employed may be otherwise mixed if desired. For the purpose of illustration, the following description of my method will be restricted to a machine mix. I first place in the mixer a desired quantity of highly heated water, preferably at a boiling point. To this I add one (1) part more or less of oxide of calcium. Because of the heated water an immediate "slake" is obtained thus providing a thin, smooth mortar. For reasons hereinafter stated I employ oxide of calcium in granular form, the grains being relatively course and about the size of a coffee bean. To the mass within the mixer and while the oxide of calcium is still slaking, I add nine (9) parts more or less of earthy material. The earthy material may consist of clay, loam, clay and loam naturally associated, gravel, pebbles, cobbles, broken stone, ashes, cinders, ashes and cinders associated with soil or soil as found along the highway or the like being surfaced. The earthy material employed is carefully sieved to separate therefrom organic matter prior to deposit in the mixing machine. When the batch has been well mixed I add thereto and mix therewith three (3) parts more or less of heated pitchy material, as asphaltum or other acceptable hydrocarbon. In practice I do not heat the pitchy material beyond 240 degrees F., because the application of higher heat has the tendency to drive off, unnecessarily, the volatile and essential oils of said material. It may be possible however to employ the hydrocarbon in cold condition as a water or naphtha formed emulsion. With the above described material thoroughly mixed it may be removed from the mixing machine, placed upon the highway or the like being formed, while still hot, and immediately subjected to compression. The chemical heat procured by the slaking of the oxide of calcium and the artificial heat contained in the pitchy material enables the composition, in batch quantities to be passed to the "rakers" upon the highway while still hot. By immediately compressing the composition a high degree of condensation is conserved which is essential in order to exclude water and air from the body of the topping or surfacing.

Experience has demonstrated that the best proportions of the substances herein employed are nine measures, more or less, of earthy material, one measure more or less of ground oxide of calcium, and three measures, more or less, of pitchy material. The mixture may be placed upon a foundation in a heated condition, as above described, or it may be manufactured in advance and at convenience and without retreatment it may be placed upon a foundation of a highway and rolled or otherwise compressed to a finished face. Should it occur in the mixing of the materials that sufficient heat has not been provided to secure a rapid association of the materials, such association can be secured by adding, as the mixing proceeds, a small portion of volatile oil, such as gasoline or crude naphtha. Should the finished material be too stiff for ready compression, a sprinkling of either of the above materials upon the face of the mixture will effect the desired result. However, experience has shown that the use of said volatile oil is usually unnecessary. It may frequently occur that the earthy material, after being sieved and piled up within convenient reach of the mixing machine, becomes very wet from frequent rains which unfits it for ready use. In such case, a portion of granulated oxide of calcium may be mixed with the sieved earthy material. This may be allowed to stand perhaps over night during which time the oxide of calcium will take up and convert all the moisture in the sieved earthy material. Upon resuming mixing the foregoing process can then be carried out, because the earthy material will be dry and in proper condition for the described process.

The pitchy material in case of clay or loam or these associated does not coat surfaces but assumes and assimilates the said clay and loam. In the case of granular materials like broken stone, gravel, and sand, the pitchy material must bind the aggregates together and these will then take the wear of traffic. This is a source of great weakness for when the aggregates granulate and become reduced to a powder by traffic, the surfacing becomes weak and cannot sustain traffic, whilst, in the case of the said clay and loam, there are no centers uncoated with the pitchy material but an actual assimilation or homogeneity is secured and very great strength results therefrom.

In practicing the above described method it is essential that the oxide of calcium be granular and relatively coarse, as stated. If reduced to a size finer than, say a coffee bean, the tendency is to absorb moisture from the air. If placed in air-tight containers the tendency is to swell, thus breaking open such containers whereby it becomes re-carbonized. According to my method I employ relatively coarse granules and immediately place same after grinding in air and water tight containers for transportation. In placing oxide of calcium in heated water, as above described, thus securing an immediate slaking and the reduction of the coarse granules in forming hydroxide of calcium, the said oxide of calcium and water becomes a smooth and finely associated mortar which when intimately mixed with the earthy material neutralizes the acids contained in said earthy material before the heated pitchy material is added. Pitchy material when mixed with earthy material while the acids thereof are active has a very deleterious effect upon the pitchy material. If the pitchy material is added to oxide of calcium prior to slaking the viscosity of the pitchy material would, practically, be destroyed. Oxide of calcium, prior to slaking, coming in contact with the pitchy material would effect what is commonly termed "limeburning." Such "limeburning" would convert the volatile and essential oils of the pitchy material into a dry, incinerated condition thus destroying the efficiency of the pitchy material as a binder. While I do not claim it is new to employ oxide of calcium in connection with pitchy material I do claim that to form a hot, relatively dry mass, in the manner above described, and then add thereto and mix therewith heated pitchy material so that the latter will readily commingle with the mass and provide a relatively dry, hot, batch of granular consistency which can be immediately passed to "rakers" upon a highway for surfacing purposes is novel. The alkali of caustic lime has an effect upon pitchy material which may be likened to that of saponification. In natural and residuum asphalts from nine (9) to sixteen (16) per cent of saponifiable fats may be found. According to my method these fats, by chemical effect, are permanently fixed in a collodial condition so that thereafter the pitchy material is not affected by changes in temperature but has uniformly resilient characteristics throughout the various seasons of the year. In road construction this result is greatly to be desired. Not only is a surfacing possessed of lasting resiliency desirable for the road itself but it serves to prevent wear and tear upon vehicles traveling thereover. It has been found that vehicles, particularly commercial vehicles of the heavy type, in traveling over highways having crystalloidal surfacings are susceptible to more wear and tear than like vehicles traveling over highways provided with resilient surfaces, especially if these latter surfaces do not promote friction producing tendencies. A highway surfaced with my composition possesses among other advantages that of lasting characteristics, (in fact it is practically permanent) thus rendering maintenance costs negligible; it may be constructed at a cost far below that now expended for road surfacing; it possesses resilient characteristics under various changes in temperature; and it may be laid at the place of mixing of the composition.

It will now be apparent that I have devised a novel and useful method which embodies the features of advantage enumerated as desirable in the statement of the invention and the above description and while I have in the present instance described the preferred embodiment thereof which has been found in practice to give satisfactory and reliable results, it is to be understood that the same is susceptible of modification in various particulars without departing from the spirit or scope of the invention or sacrificing any of its advantages.

What I claim is:—

1. The herein described method of practising highway and like surfacing which consists in mixing with heated water, oxide of calcium of relatively coarse, granular form to provide a thin mortar, then adding thereto and mixing therewith earthy material and when any acids as may be combined therewith shall have become neutralized and whilst the mass is still in a heated relatively dry condition adding thereto and mixing therewith pitchy material and then laying the resultant relatively dry, heated and granular mass upon the highway for immediate use.

2. The herein described method of practicing highway and like surfacing which consists in mixing with very highly heated water oxide of calcium of relatively coarse, granular form to provide a thin mortar, then adding thereto and mixing therewith earthy material and when any acids as may be combined therewith shall have been neutralized and whilst the mass is still in a heated relatively dry condition adding thereto and mixing therewith pitchy material in a heated condition and then laying the resultant relatively dry, heated and granular mass upon the highway for immediate use.

3. The herein described method of practicing highway and like surfacing which consists in mixing with heated water substantially one part of oxide of calcium of relatively coarse, granular form to provide a thin mortar, then adding thereto and mixing therewith substantially nine parts of earthy material and when any acids as may be combined therewith shall have been neutralized and whilst the mass is still in a heated, relatively dry condition adding thereto and mixing therewith substantially three parts of pitchy material in a heated state and then laying the resultant relatively dry, heated and granular mass upon the highway for immediate use.

In testimony whereof I have hereunto signed my name.

DONALD MacKNIGHT HEPBURN.